United States Patent
Arai et al.

[11] Patent Number: 5,988,075
[45] Date of Patent: Nov. 23, 1999

[54] SWIVELING TABLE DEVICE

[75] Inventors: Shigehiro Arai; Javad Akbari, both of Narashino, Japan

[73] Assignee: Seiko Seiki Kabushiki Kaisha, Japan

[21] Appl. No.: 08/894,111

[22] PCT Filed: Sep. 25, 1995

[86] PCT No.: PCT/JP95/01921

§ 371 Date: Aug. 12, 1997

§ 102(e) Date: Aug. 12, 1997

[87] PCT Pub. No.: WO96/24461

PCT Pub. Date: Aug. 15, 1996

[30]  Foreign Application Priority Data

Feb. 6, 1995 [JP] Japan ..................... 7-018212

[51] Int. Cl.⁶ ........................................ A47B 85/00
[52] U.S. Cl. ............................................... 108/20
[58] Field of Search .................. 108/20, 21, 22; 74/813 R, 813 C, 16, 89.15

[56]  References Cited

U.S. PATENT DOCUMENTS

| | | | |
|---|---|---|---|
| 2,902,741 | 9/1959 | Hankin, Jr. ................. | 108/22 X |
| 5,685,232 | 11/1997 | Inoue ........................... | 108/20 |
| 5,761,960 | 6/1998 | Nagai et al. ................. | 108/20 X |
| 5,794,541 | 8/1998 | Hirose ......................... | 108/20 |

FOREIGN PATENT DOCUMENTS

| | | | |
|---|---|---|---|
| 311820A2 | 4/1989 | European Pat. Off. . | |
| 428907 | 1/1975 | U.S.S.R. ................ | 108/20 |

*Primary Examiner*—Jose V. Chen
*Attorney, Agent, or Firm*—Adams & Wilks

[57]  ABSTRACT

A swiveling table apparatus comprises a base and a table main body disposed on the base and mounted for swiveling movement about a swivel axis. A driving mechanism includes a servo motor for generating a driving power to swivel the table main body about the swivel axis. A power transmission mechanism transmits the driving power of the servo motor to the table main body.

33 Claims, 7 Drawing Sheets

FIG. 1

WORK HEAD TABLE

WHEEL HEAD TABLE

13 LUBRICANT

SWIVELING TABLE DEVICE

BACKGROUND OF THE INVENTION

1. Field of the Invention

The present invention relates to machine tools and, more particularly, to a swiveling table apparatus used as a table for machine tools in general such as units for which the swivel angle must be adjusted, e.g., grinding wheel spindles and main spindles for internal grinding machines and main spindles, grinding wheel spindles and tailstocks for cylindrical grinding machines.

Background Information

For example, internal grinding according to the prior art often results in insufficient grinding at a deep internal surface of a work piece and hence in poor cylindricity for reasons including the fact that the grind stone is in contact with such a deep region for a period of time shorter than with a region of the internal surface of the work piece closer to the entrance thereof.

A conventional practice in order to mitigate the reduction in cylindricity has been to incline the grind stone relative to the center axis of the work piece or to incline the work piece rather than the grind stone relative to the center axis of the grind stone when grinding the internal surface thereof.

The mechanism disclosed in Japanese examined patent publication No. H5-47347 is known as a means for inclining a grind stone or a work piece.

Figure 7:
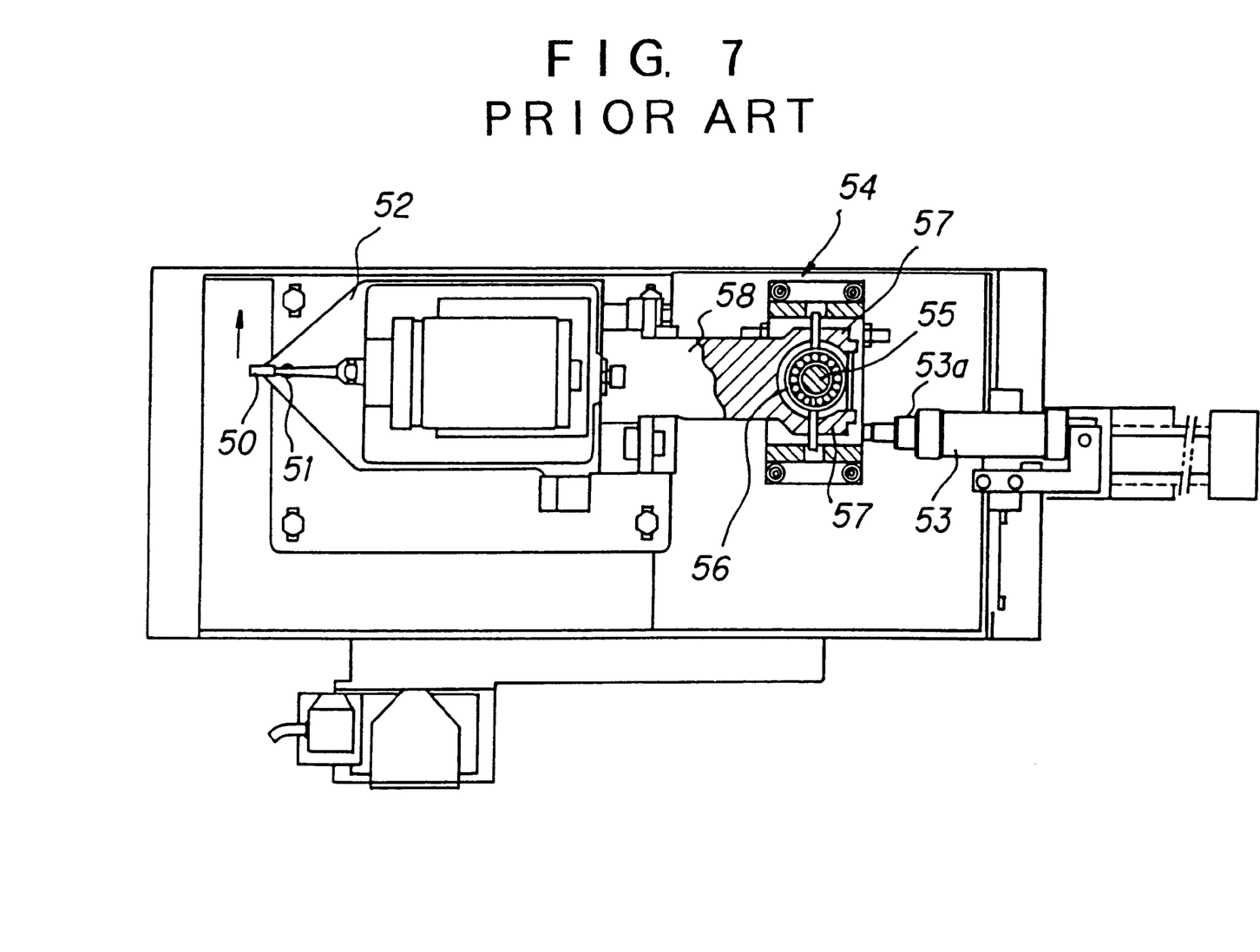
FIG. 7 illustrates a conventional swiveling table apparatus.

As shown in FIG. 7, this mechanism inclines a grind stone 50 relative to a work piece by swiveling a wheel spindle stock 52 about a base point 51 at a predetermined angle and includes a hydraulic cylinder 53 and an eccentric cam mechanism 54 as a driver for such a swivel operation.

Specifically, as a cylinder rod 53a of the hydraulic cylinder 53 is advanced and retracted, the eccentric cam mechanism 54 operates to displace an eccentric cam shaft 55, and displacement of the same from side to side is transmitted to arm portions 57, 57 through a bearing 56. This results in a movement of the arm portions 57, 57 along with a coupling plate 58 integral therewith to cause the wheel spindle stock 52 to swivel about the base point 51.

However, since the swivel operation has been conventionally caused by the eccentric cam mechanism 54 as described above, it has not been possible to change the swivel angle through numerical control. Further, although the setting of the swivel angle can be changed through a design change on the eccentric cam mechanism itself, this inevitably necessitates complicated operations such as replacing the eccentric cam mechanism 54 itself and results in poor operability in changing the setting of the swivel angle.

The present invention has been conceived taking the above-described situation into consideration. It is an object of the present invention to provide a swiveling table apparatus which allows the setting of the swivel angle to be changed by means of numerical control. Another object of the present invention is to provide a swiveling table apparatus which is easy to use.

SUMMARY OF THE INVENTION

The foregoing and other objects of the present invention are achieved by a swiveling table apparatus comprising a base, a table main body disposed on the base and mounted for swiveling movement about a swivel axis, a driving mechanism including a servo motor for generating a driving power to swivel the table main body about the swivel axis, and power transmission means for transmitting the driving power of the servo motor to the table main body.

In a first embodiment, the power transmission means comprises a ball screw rotated by the driving power generated by the driving mechanism.

In a second embodiment, the power transmission means comprises a ball screw rotated by the driving power generated by the driving mechanism. The ball screw has an end portion for abutment with a first side portion of the table main body. A biasing member biases the table main body toward the ball screw and is disposed for abutment with a second side portion of the table main body opposite the first side portion thereof. The table main body is disposed between the ball screw and the biasing member.

In a third embodiment, the power transmission means comprises a ball screw rotated by the driving power generated by the driving mechanism. A nut is connected to the table main body and is threadedly connected to the ball screw for movement therealong in response to rotation of the ball screw. A flat spring member is connected to the nut and to the table main body for absorbing any difference between moving directions of the nut and the table main body.

In a fourth embodiment, the power transmission means comprises a ball screw rotated by the driving power generated by the driving mechanism. The ball screw has a nut portion connected to the table main body. A linear guide and a bearing absorb any difference in sliding movement and rotational movement, respectively, between moving directions of the nut portion of the ball screw and the table main body.

In a fifth embodiment, the swiveling table apparatus further comprises at least one curved guide disposed between and connected to the base and the table main body for guiding a swiveling movement of the table main body about the swivel axis. In one variation, of this embodiment, the curved guide preferably comprises a curved rail having a curve concentric with the locus of swivel of the table main body and a rail receiving portion slidably engaged with the curved rail. In another variation, the at least one curved guide comprises two or more curved guides.

By the foregoing construction of the swiveling table apparatus according to the present invention, the power of the servo motor is transmitted to the table main body through the power transmission means to swivel the table main body. In the first embodiment, for example, the power of the servo motor is transmitted to the table main body by the ball screw.

By the construction of the swiveling table apparatus according to the second embodiment, the power of the servo motor causes linear movement of the ball screw. As the ball screw is advanced toward the table main body, the end of the ball screw pushes one side of the table main body to swivel the table main body in a first direction. Conversely, as the ball screw is retracted, the biasing force of the biasing member causes the table main body to swivel in a second direction opposite the first direction.

According to the swiveling table apparatus of the third embodiment, the power of the servo motor causes linear movement of the nut portion of the ball screw, and the propulsion of the nut portion is directly transmitted to the table main body through the flat spring to swivel the table main body. At this time, any difference between the moving directions of the nut portion and the table main body is absorbed by twist of the flat spring.

According to the invention of the fourth embodiment, the linear guide and the bearing absorb any difference between the moving directions of the nut portion and the table main body by dividing it into a rotating factor and a sliding factor.

According to the invention of the fifth embodiment, the table main body smoothly swivels and moves along the curved guide instead of sliding on the base.

DETAILED DESCRIPTION OF THE PREFERRED EMBODIMENTS

Embodiments of a swiveling table apparatus according to the present invention will now be described with reference to FIGS. 1 through 6.

Figure 1:
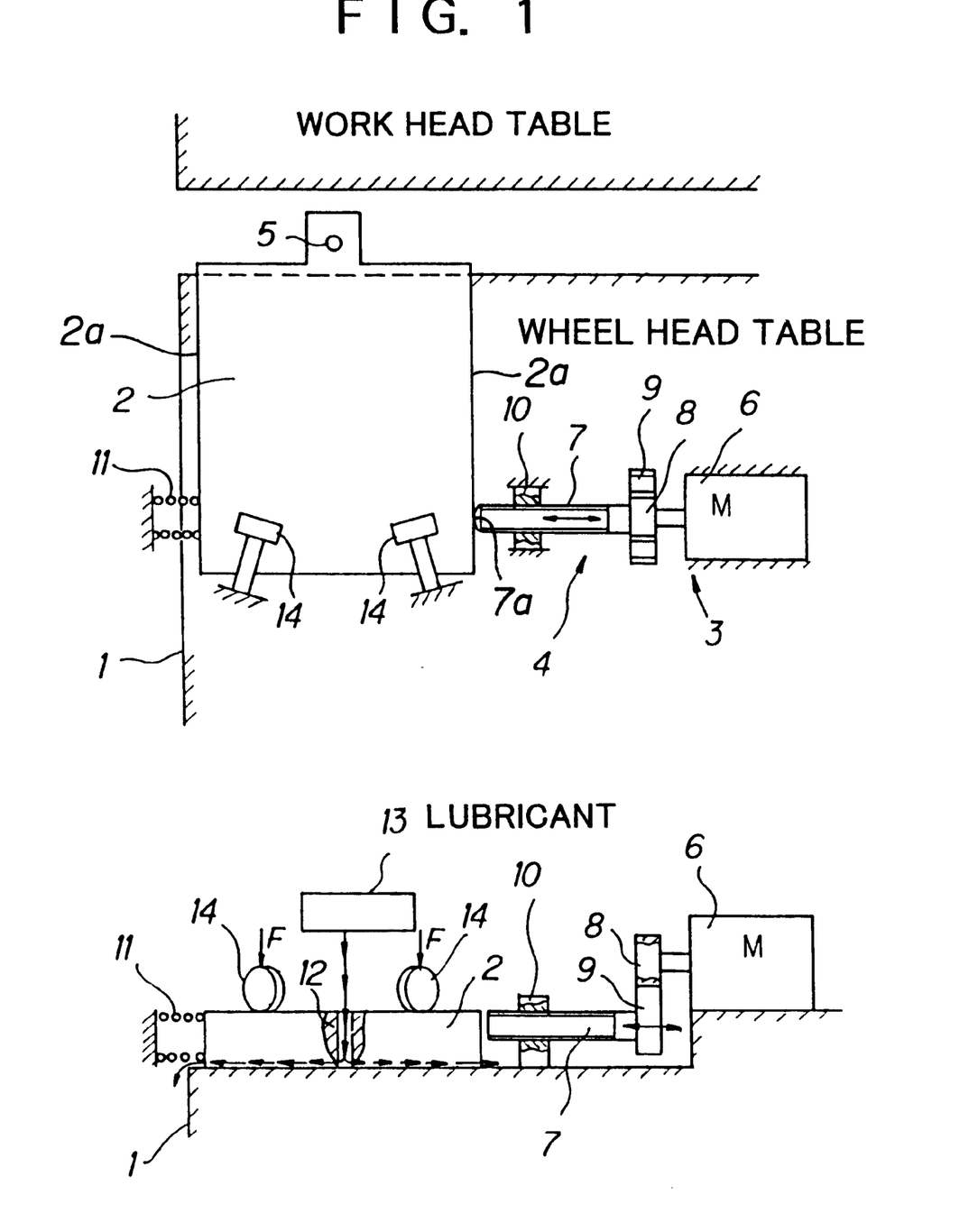
FIG. 1 is a plan view and a front view showing an embodiment of the present invention.

As shown in FIG. 1, the swiveling table apparatus includes a table main body 2 disposed on a base 1, and the table main body 2 swivels or is pivoted about a swivel shaft 5 by a power transmission means 4 and a driver 3.

From the view point of numerical control intended for the swivel angle of the table main body 2, a servo motor 6 which is an object of such numerical control is employed as the driver 3. Further, a ball screw 7 is employed as the power transmission means 4 for the reason that it is preferable for numerical control because it does not have backlash. The servo motor 6 and the ball screw 7 are connected through a driving gear 8 and a driven gear 9.

The ball screw 7 is provided tangentially to the locus of the swivel of the table main body 2 such that an end 7a of the ball screw 7 abuts against one side portion 2b of the table main body 2. A nut portion 10 of the ball screw 7 is secured to the base 1. That is, the ball screw 7 is configured to be able to move back and forth in engagement with the nut portion 10.

Such a linear movement of the ball screw 7 is caused by forward and reverse rotations of the servo motor 6. Specifically, when the servo motor 6 rotates in forward and reverse directions, the power of the same is transmitted to the ball screw 7 through the driving gear 8 and the driven gear 9 to move the ball screw 7 back and forth as described above.

A coil spring 11 as a pushing means is provided on a side portion 2b of the table main body that faces the ball screw 7 with the table main body 2 interposed therebetween, and the coil spring 11 is configured so as to push the table main body 2 toward the ball screw 7 at all times.

Thus, the table main body 2 is provided such that it is sandwiched between the ball screw 7 and the coil spring 11 and is configured so as to receive a pushing force produced as the ball screw 7 is advanced and a pushing force from the spring 11.

The table main body 2 slides on the base 1 as it swivels and, in order to allow it to slide smoothly, lubricating oil 13 is supplied to a gap between the table main body 2 and the base 1 through a lubricating oil supply path 12 in the table main body 2.

Pushing cams 14, 14 are provided on the upper side of the table main body 2, and the table main body 2 is pushed toward and secured to the base 1 by a pushing force from the pushing cams 14, 14 to eliminate the gap between the base 1 and the table main body 2.

Next, the operation of the swiveling table apparatus having the above-described configuration will be described with reference to FIG. 1.

In this swiveling table apparatus, as the servo motor 6 rotates at a predetermined angle to cause the ball screw 7 to advance toward the table main body 2, the end of the ball screw 7 pushes one side of the table main body 2 to swivel the table main body 2 about the swivel shaft 5.

Conversely, as the ball screw 7 is retracted, the table main body 2 is swiveled in the direction opposite to that described above by an elastic restoring force of the coil spring 11.

At this time, the swivel angle of the table main body 2 is proportionate to the amount of the back and forth movement of the ball screw 7 which is in turn proportionate to the rotating angle of the servo motor 6.

That is, the numerical control over the swivel angle of the table main body 2 can be performed through numerical control over the rotating angle of the servo motor 6.

When the swiveling table apparatus is used, for example, as the table of a grinding wheel spindle or a main spindle, the grinding wheel spindle or main spindle is set on the table main body 2. When the grinding wheel spindle is placed on and secured to the table main body 2, the grind stone can be inclined relative to the center axis of a work piece at a predetermined angle by swiveling the table main body 2. When the main spindle is placed on and secured to the table main body 2, the work piece can be inclined relative to the center axis of the grind stone at a predetermined angle.

That is, the apparatus of the present embodiment has a configuration in which the table main body 2 is swiveled by the servo motor 6 and the ball screw 7. As a result, the swivel angle of the table main body 2 is proportionate to the amount of the back and forth movement of the ball screw 7 and the rotating angle of the servo motor 6. This makes it possible to easily perform numerical control over the swivel angle of the table main body 2 through control over the rotating angle of the servo motor 6 and improves ease of operation in changing the setting of a swivel angle of this kind.

However, since the apparatus of the present embodiment has a structure in which the table main body 2 and the base 1 slide on each other, the table main body 2 vibrates very slightly, i.e., a so-called stick-slip occurs resulting in a large delay in response. Further, since the ball screw 7 and the coil spring 11 face each other with the table main body interposed therebetween in this structure, the table main body 2 is vulnerable to vibration in the direction in which the coil spring 11 expands and contracts and hence does not have high rigidity against vibration.

Improvements were made in consideration to such points for purposes including preventing a stick slip and improving rigidity against vibration to provide the swiveling table apparatus shown in FIG. 2 which will now be described in detail by focusing attention on such improvements.

Figure 2:
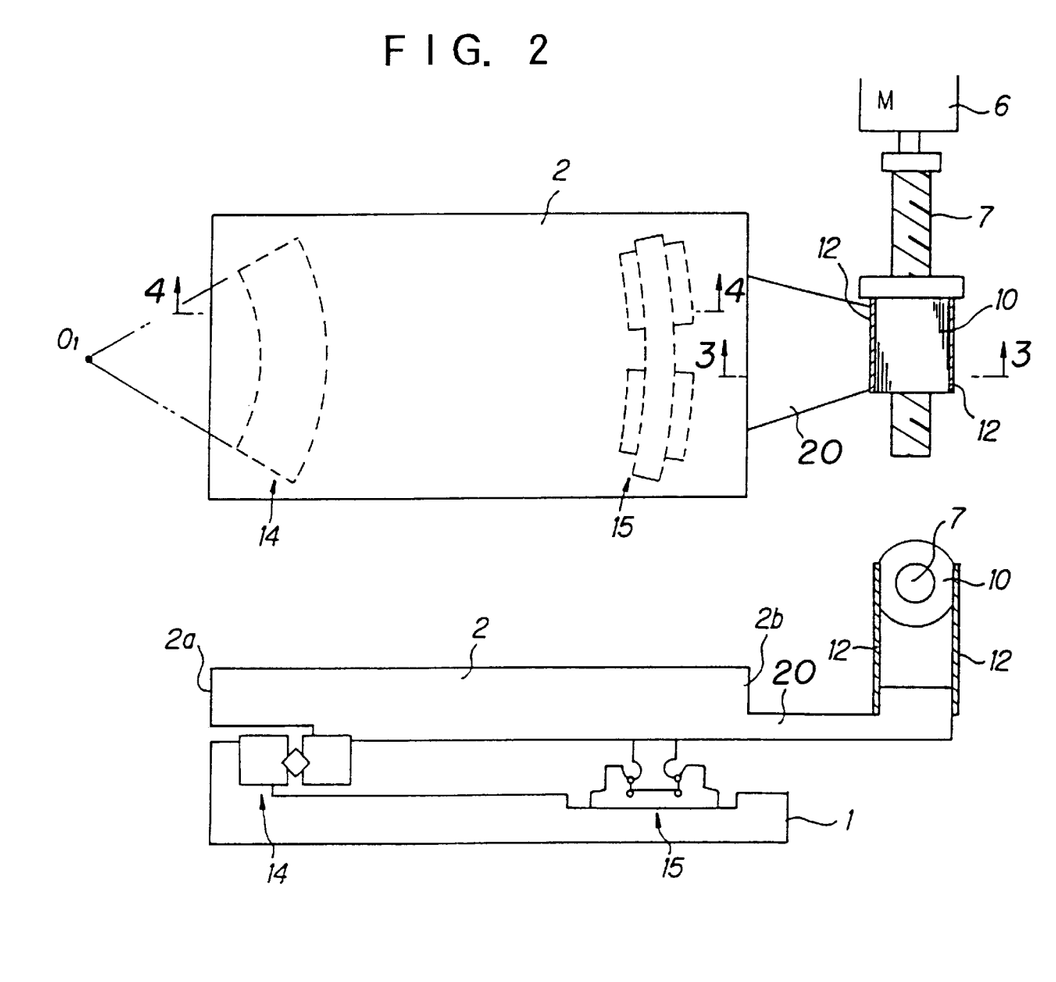
FIG. 2 is a plan view and a front view showing another embodiment of the present invention.

The swiveling table apparatus shown in FIG. 2 includes flat springs 12, 12 which are provided on both sides at the periphery thereof and are arranged such that one side thereof faces another end face 2b of the table main body 2.

Figure 3:
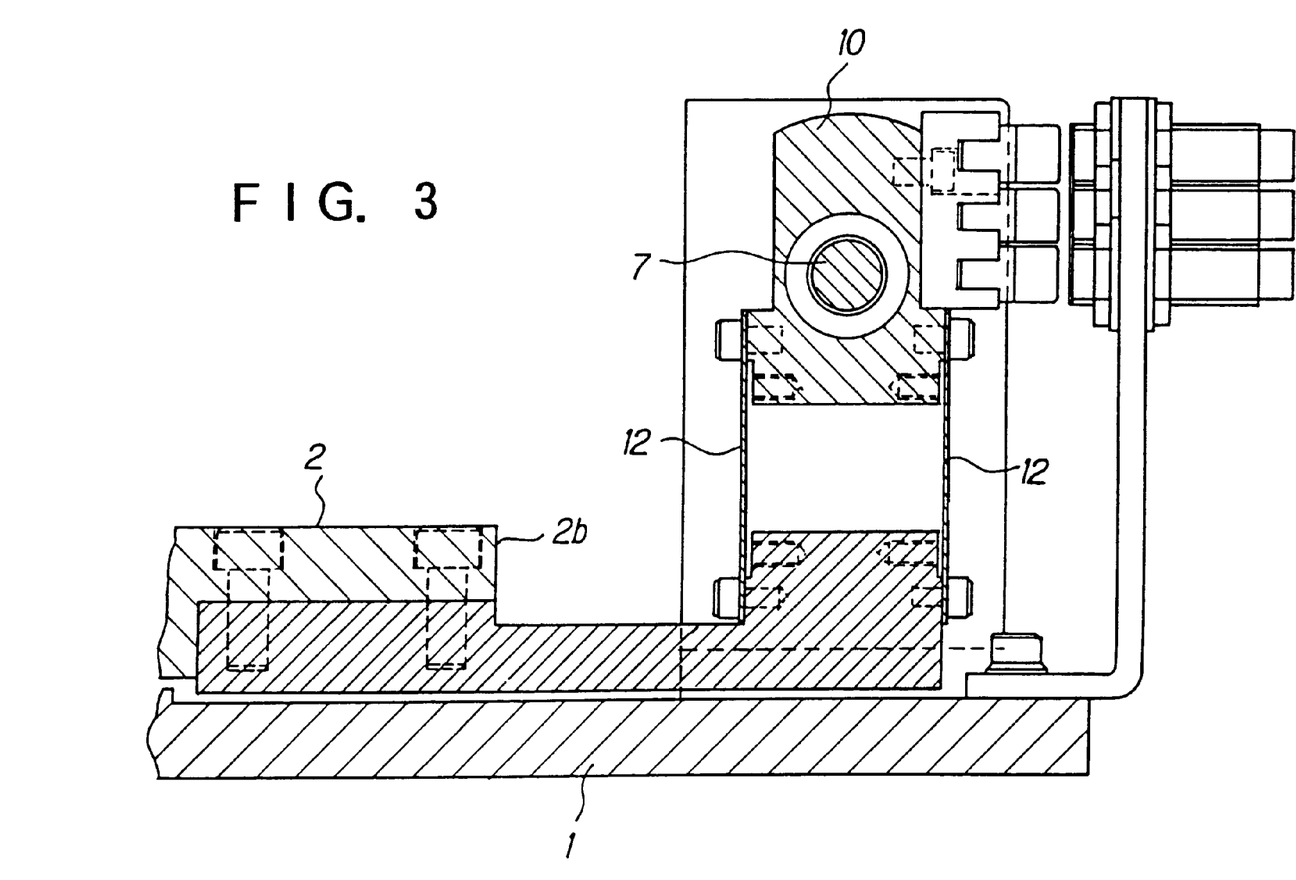
FIG. 3 is a sectional view taken along the line 3—3 in FIG. 2.

As shown in FIG. 3, one end of the flat springs 12, 12 is connected to the nut portion 10, and the other end of the flat spring 12, 12 is connected to the table main body 2 through a power transmission arm 20.

In the present embodiment, the nut portion 10 is provided such that it is slidable along the ball screw 7 instead of being secured to the base 1; the servo motor 6 is secured to the base 1; and the ball screw 7 is directly coupled to the rotating shaft of the servo motor 6. That is, a configuration is employed wherein when the servo motor 6 directly rotates the ball screw 7, the nut portion 10 makes a linear movement in engagement with the ball screw 7.

As shown in FIG. 2, two curved guides 14, 15 are disposed between the base 1 and the table main body 2. Those curved guides 14, 15 are provided to guide the swivel of the table main body 2. One of the curved guides 14 is provided on the side of one end face 2a of the table main body 2, and the other curved guide 15 is provided on the side of the other end face 2b of the table main body 2.

Figure 4:
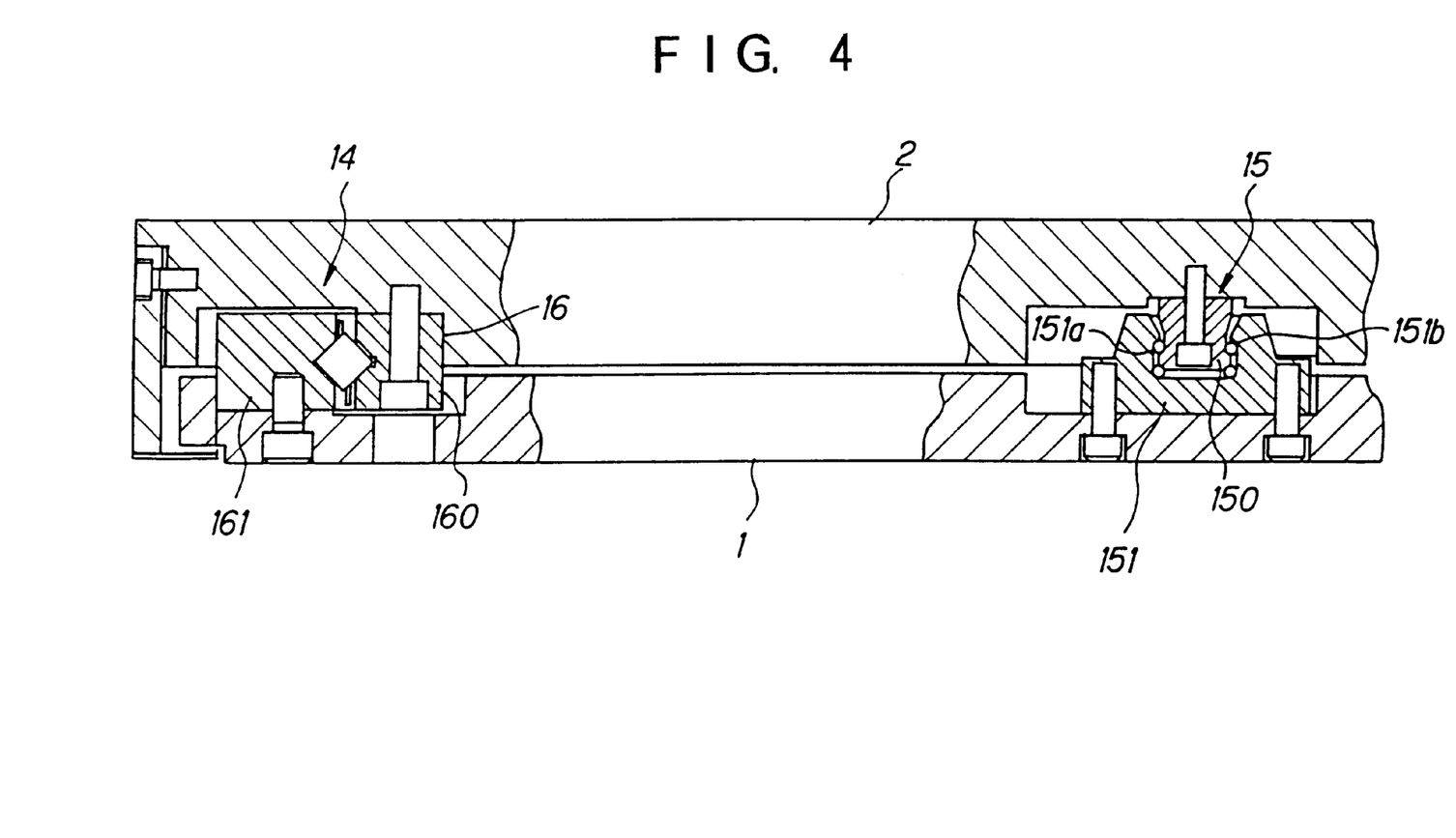
FIG. 4 is a sectional view taken along the line 4—4 in FIG. 2.

As shown in FIG. 4, a cross roller bearing 16 is employed as one of the curved guides 14. An outer ring portion 160 and an inner ring portion 161 of the cross roller bearing 16 are screwed and secured to the lower and upper sides of the table main body 2, respectively.

The other curved guide is comprises a curved rail 150 and a rail receiving portion 151. The curved rail 150 has a curve concentric with the locus of the swivel of the table main body 2 and is mounted on the lower side of the table main body 2. The rail receiving portion 151 is mounted on the upper side of the base 1 and includes an engagement groove 151a having a curve similar to that of the curved rail 150. The curved rail 150 is slidably attached to the engagement groove 151a through a rolling body 151b. That is, the rail receiving portion 151 is slidably engaged with the curved rail 150 through the rolling body 151b.

The two curved guides 14, 15 having such configurations are in a concentric positional relationship with each other as shown in FIG. 2, the concentric circles being centered on a center of swivel 01 of the table main body 2. The center of swivel 01 is a virtual center rather than an actual swivel shaft.

Operation of the swiveling table apparatus having the above-described configuration will now be described based on FIG. 2.

In this swiveling table apparatus, when the servo motor 6 rotates the ball screw 7, the nut portion 10 makes a linear movement in engagement with the ball screw 7.

As a result of the linear movement of the nut portion 10 as described above, the propulsion of the nut portion 10 is transmitted to the table main body 2 through the flat springs 12, 12 and the power transmission arm 13 to swivel the table main body 2 about the virtual center of swivel 01.

At this time, the table main body 2 smoothly swivels and moves along the two curved guides 14, 15 instead of sliding on the base 1.

Further, although the moving directions of the nut portion 10 and the table main body 2 are different, the difference in the moving direction is absorbed by a twist of the flat springs 12, 12.

In summary, the apparatus of the present embodiment has a configuration wherein the table main body 2 is swiveled through the curved guides 14, 15. As a result, the table main body 1 is not in sliding contact with the base 1 when swiveled, and this makes it possible to prevent the problem caused by such sliding contact, i.e., a stick-slip. Further, this eliminates the need for supplying lubricating oil to the gap between the table main body 2 and the base 1, thereby allowing measures for preventing the leakage of lubricating oil to be omitted.

In the present apparatus, the table main body 2 and the nut 10 of the ball screw 7 are connected to each other through the flat springs 12, 12. Since this allows the table main body 2 and the nut portion 10 to be integrated through the flat springs 12, 12, the table main body 2 has high rigidity against vibration, and the apparatus is simply constructed at a low cost.

Specifically, the flat springs 12, 12 are arranged on the side of an end face of the table main body 2 such that they face each other at one side thereof. As a result, even if a grinding load is applied to the table main body 2 from the grinding wheel spindle provided on the table main body 2, the flat springs 12, 12 are not easily bent by the load in that direction. This is effective in suppressing vibration of the table main body 2 due to this kind of load.

The present apparatus has a configuration wherein the swivel of the table main body 2 is guided by the two curved guides 14, 15 to swivel the table main body 2 about a virtual swivel center instead of an actual swivel shaft. This eliminates the need for a swivel shaft at the center of swivel and allows the apparatus to be configured compactly because an extra space for providing this kind of swivel shaft can be eliminated.

However, the present apparatus having a structure wherein the table main body 2 and the nut portion 10 of the ball screw 7 are connected to each other by the flat springs 12, 12 is not suitable for numerical control because a twisting force of the flat springs 12, 12 varies depending on the amount of the twist. Further, the table main body 2 swivels at only a small angle because the amount of the twist is small.

Improvements were made in consideration to such points for purposes including improving suitability to numerical control and expanding the range of the swivel angle to provide the swiveling table apparatus shown in FIG. 5 which will now be described in detail by focusing attention on such improvements.

Figure 5:
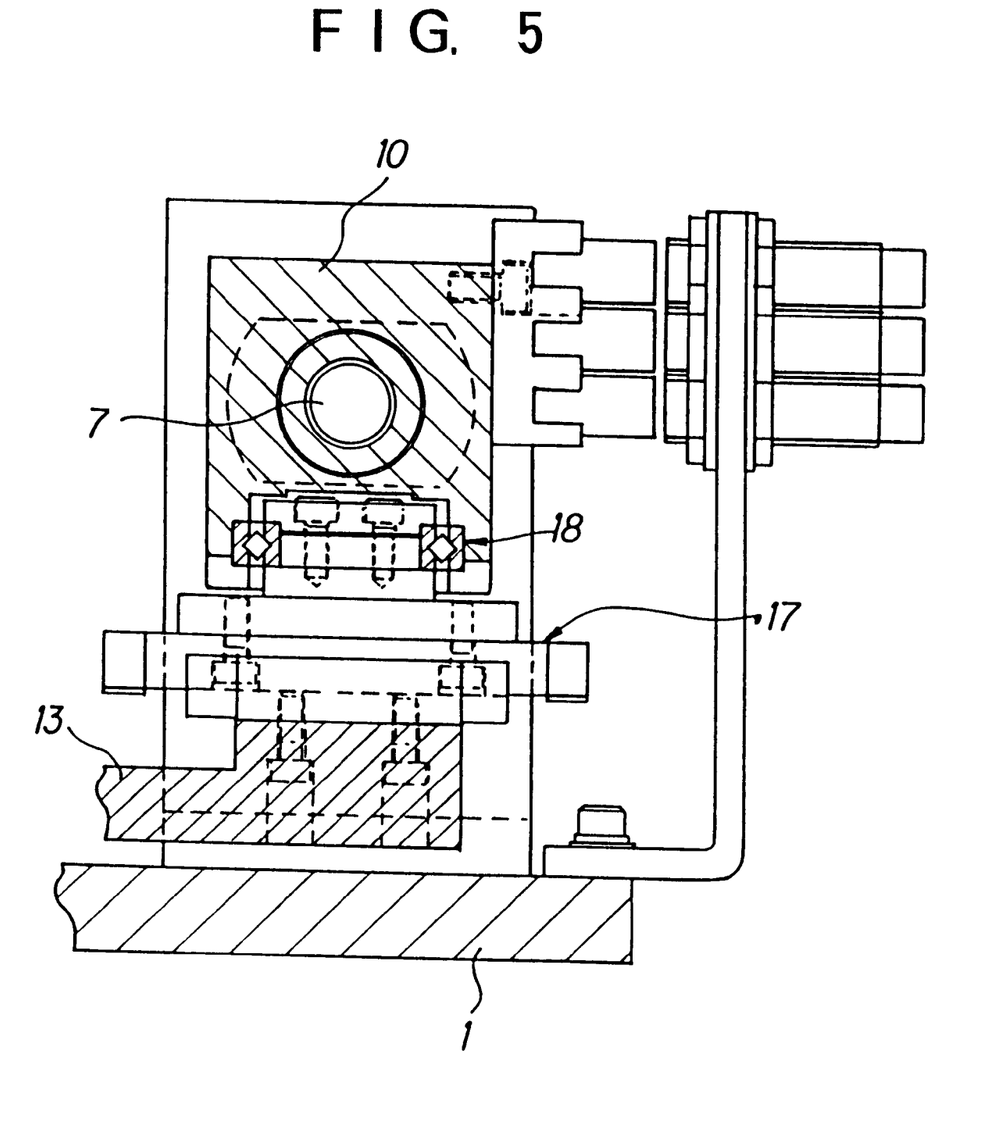
FIG. 5 is a sectional view showing still another embodiment of the present invention.

In the swiveling table apparatus shown in FIG. 5, the table main body 2 and the nut 10 of the ball screw 7 are connected to each other by a linear guide 17 and a bearing-type bearing 18 instead of the flat springs 12, 12 (see FIG. 3)

The linear guide 17 and the bearing 18 absorb any difference between the moving directions of the nut portion 10 and the table main body 2 by dividing it into a rotating factor and a sliding factor. The linear guide 17 is configured to absorb said sliding factor through a sliding movement thereof, and the bearing 18 is configured to absorb said rotating factor through rotation thereof.

That is, in the apparatus of the present embodiment, the portion connecting the table main body 2 and the nut portion 10 of the ball screw 7 is constituted by the linear guide 17 and the bearing 18, thereby absorbing any difference between the moving directions of the table main body 2 and the nut portion 10 by dividing it into a rotating factor and a sliding factor. Since said connecting portion thus has a movable structure unlike the case of flat springs, it can accommodate a large swivel angle of the table main body 2, has high rigidity, and is suitable for numerical control because it is not subjected to a twisting force as in flat springs.

Figure 6:
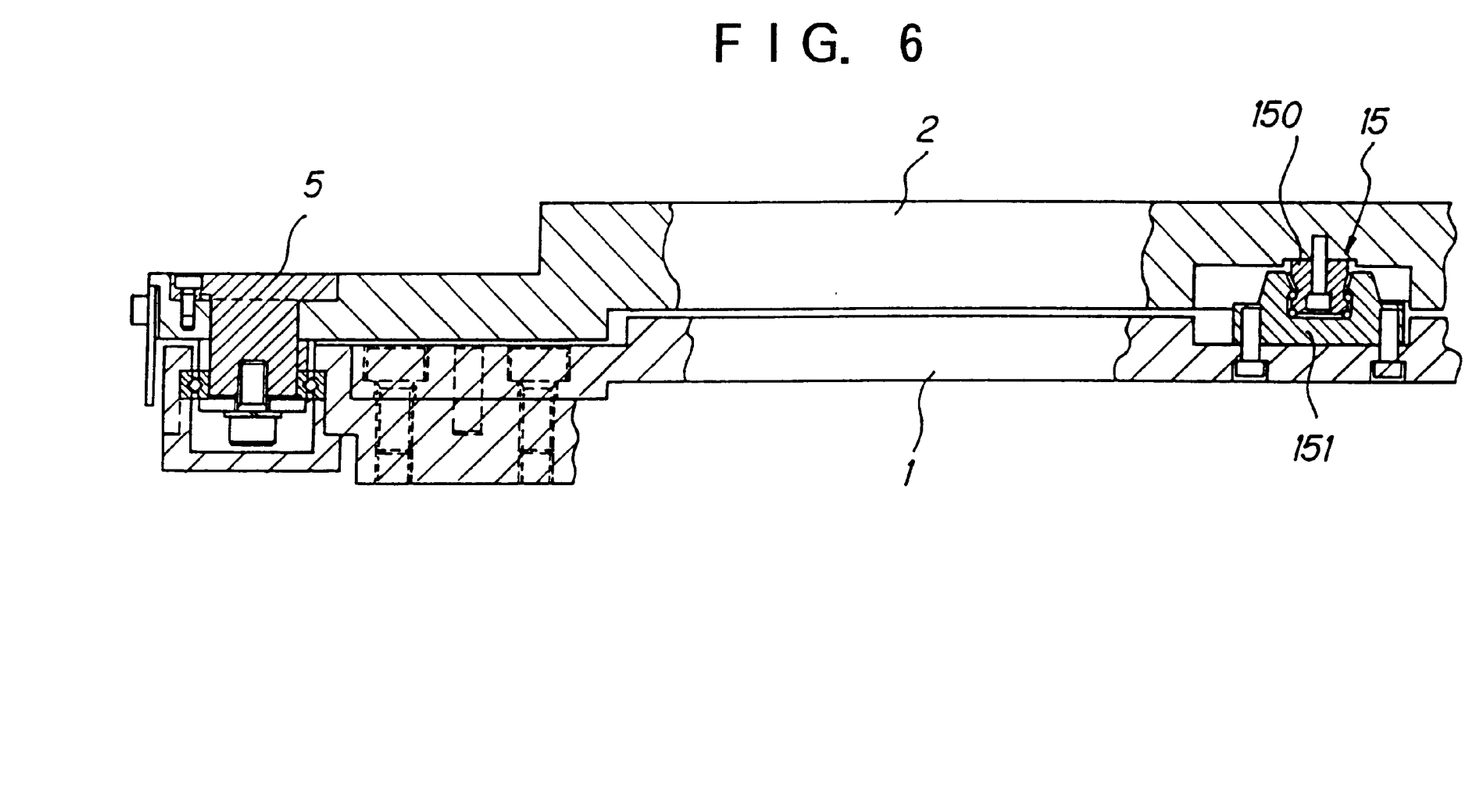
FIG. 6 is a sectional view showing still another embodiment of the present invention.

Although the above-described embodiment employs a configuration wherein two curved guides 14, 15 are provided, a configuration as shown in FIG. 6 may be employed wherein one of the curved guide 14 is deleted and one curved guide 15 and a swivel shaft 5 (see FIG. 6) are provided. In this case, the table main body 2 swivels about the swivel shaft 5 under guidance provided by the curved guide 15.

Referring to the curved guides 14, 15, a curved hydrostatic bearing may be used, and two or more of such parts may be provided, As described above, a swiveling table apparatus according to the present invention has a configuration wherein the power of a servo motor is transmitted to a table main body through a power transmission means to swivel the table main body. This makes it possible to perform numerical control over the swivel angle of the table main body through control over the rotating angle of the servo motor, thereby improving ease of operation in changing the setting of this type of swivel angle.

Especially, the invention according to an embodiment has a configuration wherein the swivel operation of the table main body is performed by means of a servo motor and a ball screw. As a result, the swivel angle of the table main body is proportionate to the amount of back and forth movement of the ball screw and the rotating angle of the servo motor, and this makes possible to easily perform numerical control over the rotating angle of the servo motor.

The invention according to another embodiment has a configuration wherein the portion connecting the table main body and a nut portion of the ball screw is constituted by a linear guide and a bearing, thereby absorbing any difference between the moving directions of the table main body and the nut portion by dividing it into a rotating factor and a sliding factor. Since the connecting portion thus has a movable structure unlike the case of flat springs, it can accommodate a large swivel angle of the table main body, has high rigidity, and is suitable for numerical control because it is not subjected to a twisting force as in flat springs.

We claim:

1. A swiveling table apparatus comprising: a base; a table main body disposed on the base and mounted for swiveling movement about a swivel axis; a driving mechanism including a servo motor for generating a driving power to swivel the table main body about the swivel axis; and power transmission means for transmitting the driving power of the servo motor to the table main body.

2. A swiveling table apparatus according to claim 1; wherein the power transmission means comprises a ball screw rotated by the driving power generated by the driving mechanism.

3. A swiveling table apparatus according to claim 1; wherein the power transmission means comprises a ball screw rotated by the driving power generated by the driving mechanism, the ball screw having an end portion for abutment with a first side portion of the table main body; and further comprising biasing means for biasing the table main body toward the ball screw, the biasing means being disposed for abutment with a second side portion of the table main body opposite the first side portion thereof, and the table main body being disposed between the ball screw and the biasing means.

4. A swiveling table apparatus according to claim 3; further comprising driving means for driving the servo motor by numerical control for adjusting a swivel angle of the table main body.

5. A swiveling table apparatus according to claim 1; wherein the power transmission means comprises a ball screw rotated by the driving power generated by the driving mechanism; and further comprising a nut threadedly connected to the ball screw for movement therealong in response to rotation of the ball screw and connected to the table main body, and a flat spring member connected to the nut and to the table main body for absorbing any difference between moving directions of the nut and the table main body.

6. A swiveling table apparatus according to claim 5; further comprising driving means for driving the servo motor by numerical control for adjusting a swivel angle of the table main body.

7. A swiveling table apparatus according to claim 1; wherein the power transmission means comprises a ball screw rotated by the driving power generated by the driving mechanism, the ball screw having a nut portion connected to the table main body; and further comprising a linear guide and a bearing for absorbing any difference in sliding movement and rotational movement, respectively, between moving directions of the nut portion of the ball screw and the table main body.

8. A swiveling table apparatus according to claim 7; further comprising driving means for driving the servo motor by numerical control for adjusting a swivel angle of the table main body.

9. A swiveling table apparatus according to claim 1; further comprising at least one curved guide disposed between and connected to the base and the table main body for guiding a swiveling movement of the table main body about the swivel axis.

10. A swiveling table apparatus according to claim 9; wherein the at least one curved guide comprises two or more curved guides.

11. A swiveling table apparatus according to claim 10; wherein each of the curved guides comprises a curved rail having a curve concentric with the locus of swivel of the table main body and a rail receiving portion slidably engaged with the curved rail.

12. A swiveling table apparatus according to claim 9; wherein the curved guide comprises a curved rail having a curve concentric with the locus of swivel of the table main body and a rail receiving portion slidably engaged with the curved rail.

13. A swiveling table apparatus according to claim 1; further comprising driving means for driving the servo motor by numerical control for adjusting a swivel angle of the table main body.

14. A swiveling table apparatus according to claim 3; wherein the power transmission means further comprises a nut portion integrally connected to the base and threadedly engaged with the ball screw.

15. A swiveling table apparatus comprising: a base; a table main body disposed on the base and mounted for swiveling movement about a swivel axis; a servo motor for generating a driving power to swivel the table main body about the swivel axis, the servo motor being driven by numerical control for adjusting a swivel angle of the table main body; a ball screw rotated by the driving power generated by the servo motor for transmitting the driving power of the servo motor to the table main body, the ball screw having a nut portion connected to the table main body; and a linear guide and a bearing for absorbing any difference in sliding movement and rotational movement, respectively, between moving directions of the nut portion of the ball screw and the table main body.

16. A swiveling table apparatus comprising: a base; a table main body disposed on the base and mounted for swiveling movement about a swivel axis; a servo motor for generating a driving power to swivel the table main body about the swivel axis, the servo motor being driven by numerical control for adjusting a swivel angle of the table main body; power transmission means for transmitting the driving power of the servo motor to the table main body; and at least one curved guide disposed between and connected to the base and the table main body for guiding a swiveling movement of the table main body about the swivel axis.

17. A swiveling table apparatus according to claim 16; wherein the at least one curved guide comprises two or more curved guides.

18. A swiveling table apparatus according to claim 16; wherein the curved guide comprises a curved rail having a curve concentric with the locus of swivel of the table main body and a rail receiving portion slidably engaged with the curved rail.

19. A swiveling table apparatus comprising: a base; a table main body disposed on the base and mounted for swiveling movement about a swivel axis; driving means for generating a driving power to swivel the table main body about the swivel axis; and power transmission means mounted on the base for undergoing linear movement for transmitting the driving power of the driving means to the table main body to thereby swivel the table main body about the swivel axis.

20. A swiveling table apparatus according to claim 19; wherein the driving means includes means operated by numerical control for adjusting a swivel angle of the table main body.

21. A swiveling table apparatus according to claim 19; wherein the power transmission means comprises a ball screw rotated by the driving power generated by the driving means.

22. A swiveling table apparatus according to claim 21; wherein the ball screw has an end portion for abutment with a first side portion of the table main body; and further comprising a biasing member for biasing the table main body toward the ball screw, the biasing member being disposed for abutment with a second side portion of the table main body opposite the first side portion thereof.

23. A swiveling table apparatus according to claim 22; wherein the table main body is disposed between the ball screw and the biasing member.

24. A swiveling table apparatus according to claim 21; further comprising a nut connected to the table main body and threadedly connected to the ball screw for movement therealong in response to rotation of the ball screw, and absorbing means for absorbing any difference between moving directions of the nut and the table main body.

25. A swiveling table apparatus according to claim 24; wherein the absorbing means comprises a flat spring member connected to the nut and to the table main body.

26. A swiveling table apparatus according to claim 21; wherein the ball screw has a nut portion connected to the table main body; and further comprising absorbing means for absorbing any difference in sliding movement and rotational movement between moving directions of the nut portion of the ball screw and the table main body.

27. A swiveling table apparatus according to claim 19; further comprising guiding means for guiding a swiveling movement of the table main body about the swivel axis.

28. A swiveling table apparatus according to claim 27; wherein the guiding means comprises at least one curved guide disposed between and connected to the base and the table main body.

29. A swiveling table apparatus according to claim 28; wherein the at least one curved guide comprises two or more curved guides.

30. A swiveling table apparatus according to claim 29; wherein each of the curved guides comprises a curved rail having a curve concentric with the locus of swivel of the table main body and a rail receiving portion slidably engaged with the curved rail.

31. A swiveling table apparatus according to claim 28; wherein the curved guide comprises a curved rail having a curve concentric with the locus of swivel of the table main body and a rail receiving portion slidably engaged with the curved rail.

32. A swiveling table apparatus according to claim 19; wherein the driving means comprises a servo motor.

33. A swiveling table apparatus according to claim 32; further comprising means for driving the servo motor by numerical control for adjusting a swivel angle of the table main body.

\* \* \* \* \*